United States Patent
Sillard et al.

(10) Patent No.: US 6,628,873 B1
(45) Date of Patent: Sep. 30, 2003

(54) DISPERSION SHIFTED FIBER FOR WAVELENGTH DIVISION MULTIPLEX FIBER OPTIC TRANSMISSION SYSTEMS

(75) Inventors: Pierre Sillard, Paris (FR); Louis-Anne de Montmorillon, Paris (FR); Ludovic Fleury, Bois D'Arcy (FR); Pascale Nouchi, Maisons Laffitte (FR)

(73) Assignee: Alcatel, Paris (FR)

( * ) Notice: Subject to any disclaimer, the term of this patent is extended or adjusted under 35 U.S.C. 154(b) by 198 days.

(21) Appl. No.: 09/722,059

(22) Filed: Nov. 27, 2000

Related U.S. Application Data

(63) Continuation-in-part of application No. 09/471,025, filed on Dec. 23, 1999.

(30) Foreign Application Priority Data

Nov. 25, 1999 (FR) .............................. 99 14829
Nov. 24, 2000 (EP) .............................. 00403301

(51) Int. Cl.⁷ .............................. G02B 6/02; G02B 6/18
(52) U.S. Cl. ....................... 385/124; 385/127
(58) Field of Search ................ 385/123–128, 385/141–146

(56) References Cited

U.S. PATENT DOCUMENTS

| | | | |
|---|---|---|---|
| 6,396,987 B1 * | 5/2002 | de Montmorillon et al. | 385/123 |
| 6,421,491 B1 * | 7/2002 | Liu | 385/127 |
| 6,434,310 B1 * | 8/2002 | Liu et al. | 385/123 |
| 2002/0006259 A1 * | 1/2002 | Tirloni | 385/127 |
| 2002/0102082 A1 * | 8/2002 | Sarchi et al. | 385/123 |

* cited by examiner

Primary Examiner—Akm E. Ullah
Assistant Examiner—Michelle R. Connelly-Cushwa
(74) Attorney, Agent, or Firm—Sughrue Mion, PLLC

(57) ABSTRACT

The present invention relates to an in-cable monomode optical fiber comprising an optical core surrounded by optical cladding, said optical core presenting an index profile constituted by a stepped central part, surrounded by an intermediate zone of refractive index less than that of said central part, itself surrounded by an annular zone having refractive index less than that of said central part and greater than that of said intermediate zone, said fiber having, for a wavelength of 1550 nm, a chromatic dispersion slope in the range 0 to 0.1 ps/nm²·km, said fiber being characterized in that it further presents the following features for a wavelength of 1550 nm:

- an effective surface area greater than or equal to 60 $\mu m^2$,
- a chromatic dispersion in the range 3 ps/(nm·km) to 14 ps/(nm·km), and
- a ratio between the effective surface area and the chromatic dispersion slope greater than 900 $\mu m^2 \cdot nm^2 \cdot km/ps$.

80 Claims, 1 Drawing Sheet

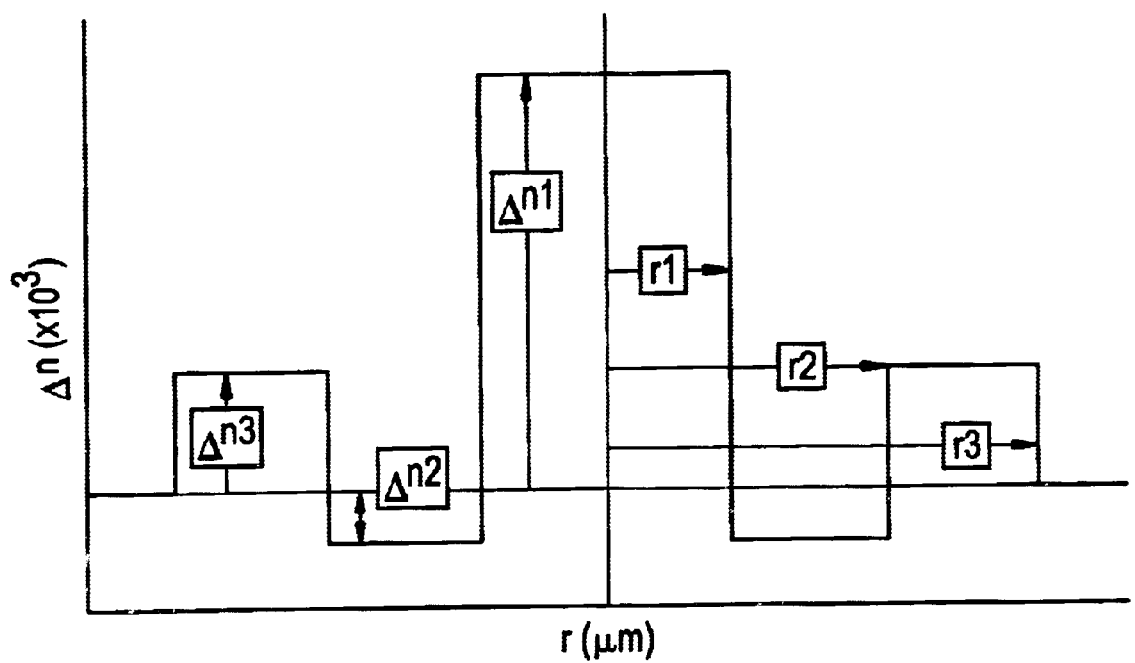
FIGURE

DISPERSION SHIFTED FIBER FOR WAVELENGTH DIVISION MULTIPLEX FIBER OPTIC TRANSMISSION SYSTEMS

This is a Continuation-in-Part of Application Ser. No. 09/471,025 filed Dec. 23, 1999.

BACKGROUND OF THE INVENTION

The present invention relates to fiber optic transmission and more particularly to wavelength division multiplex transmission using dispersion shifted fiber as the line fiber.

The index profile of optical fibers is generally characterized as a function of the shape of the graph of the function that associates the radius of the fiber and the refractive index. It is conventional to plot on the abscissa axis the distance r to the center of the fiber and on the ordinate axis the difference between the refractive index and the refractive index of the cladding of the fiber. The expressions "step profile", "trapezium profile" and "triangle profile" are used to refer to graphs which respectively have step, trapezium and triangle shapes. These curves are generally representative of the theoretical profile or set point profile of the fiber and fiber fabrication constraints can yield a substantially different profile.

To use a fiber in a transmission system, and in particular in a wavelength division multiplex transmission system, it is beneficial for the fiber to have a large effective surface area in the range of wavelengths of the multiplex. A large effective surface area limits the power density in the fiber, at total constant power, and limits or prevents undesirable non-linear effects.

For high bit rate systems, it is also beneficial for the fiber to assure monomode propagation of the channels of the multiplex. ITU-T Recommendation G.650 defines the in-cable cut-off wavelength. The theoretical cut-off wavelength of the fiber is generally several hundred nanometers greater than the in-cable cut-off wavelength. It appears that propagation in an optical fiber can be monomode, even if the theoretical cut-off wavelength is greater than the wavelength of the signals used: beyond a distance of a few meters or tens of meters, which is small in comparison with the propagation distances in fiber optic transmission systems, the secondary modes disappear because of excessive attenuation. Propagation in the transmission system is then monomode.

It is also important for the fiber to have as small a sensitivity as possible to bends and microbends. The sensitivity to bends is evaluated, as explained in ITU-T Recommendation G.650, by measuring the attenuation caused by winding 100 turns of a fiber around a 30 mm diameter spool. The sensitivity to microbends is measured in a manner that is well known in the art; as described hereinafter, it can be measured relative to a fiber such as the ASMF 200 fiber manufactured by the assignees of the applicants.

In new high bit rate wavelength division multiplex transmission networks it is advantageous to limit the chromatic dispersion slope in the range of wavelengths of the multiplex; the objective is to minimize distortion between channels of the multiplex during transmission.

Dispersion shifted fibers (DSF) are now commercially available. Their chromatic dispersion is substantially zero at the transmission wavelength at which they are used, the chromatic dispersion generally being different from the wavelength of 1.3 $\mu$m at which the dispersion of the silica is substantially zero. In other words, the non-zero chromatic dispersion of the silica is compensated by an increase in the index difference $\Delta n$ between the fiber core and the optical cladding. This index difference shifts the wavelength for zero chromatic dispersion; it is obtained by introducing dopants into the preform during its fabrication, for example by an MCVD process well known in the art and not described in detail here. Non-zero dispersion shifted fibers (NZ-DSF) are dispersion shifted fibers which have non-zero chromatic dispersion at the wavelengths at which they are used. The non-zero chromatic dispersion limits non-linear effects in the fiber and in particular four-wave mixing between the channels of the multiplex.

Document EP-0 883 002 relates, with reference to its FIG. 3C, to in-cable monomode DSF fibers, having a step and ring profile and an average chromatic dispersion slope of 0.043 ps/nm²·km. However, those fibers have negative chromatic dispersion of about 1550 nm.

The problem with DSF, as explained in document EP-A-0 859 247, is that the chromatic dispersion slope generally increases as the effective surface area increases.

EP-A-0 859 247 describes ring profile DSF and explains that for such fibers there is a range in which the effective surface area and the chromatic dispersion slope vary in different directions. The fibers referred to by way of example have a negative chromatic dispersion in the range −4.5 ps/(nm·km) to −1.0 ps/nm·km. They have a cut-off wavelength greater than 1500 nm for a fiber length of 2 m. The above document specifies that the high cut-off wavelength is not a problem because the cut-off wavelength decreases with the propagation distance and monomode propagation is assured for transmission distances in the order of 1000 km.

SUMMARY OF THE INVENTION

The invention proposes an optical fiber that can be used in a cable and which represents an advantageous compromise between the effective surface area and the chromatic dispersion slope, in particular by virtue of the chosen cut-off wavelength, and which is additionally easy to fabricate.

To be more precise, the invention consists in an in-cable monomode optical fiber comprising an optical core surrounded by optical cladding, said optical core presenting an index profile constituted by a stepped central part, surrounded by an intermediate zone of refractive index less than that of said central part, itself surrounded by an annular zone having refractive index less than that of said central part and greater than that of said intermediate zone, said fiber having, for a wavelength of 1550 nm, a chromatic dispersion slope in the range 0 to 0.1 ps/nm²·km, said fiber being characterized in that it further presents the following features for a wavelength of 1550 nm:

- an effective surface area greater than or equal to 60 $\mu$m²,
- a chromatic dispersion in the range 3 ps/(nm·km) to 14 ps/(nm·km), and
- a ratio between the effective surface area and the chromatic dispersion slope greater than 900 $\mu$m²·nm²·km/ps.

The fiber of the invention has, simultaneously, a strong effective surface area, positive chromatic dispersion of about 1550 nm, and a chromatic dispersion slope which remains small. It has the advantage of satisfying requirements concerning bending losses and sensitivity to microbends, while being easy to fabricate.

The fiber of the invention preferably has chromatic dispersion at 1550 nm in the range 5 ps/nm·km to 11 ps/nm·km and/or a chromatic dispersion slope less than 0.07 ps/nm²·km.

The fiber of the invention preferably has a ratio between the effective surface area and the chromatic dispersion slope greater than or equal to 1000 $\mu m^2 \cdot nm^2 \cdot km/ps$. This ratio is preferably less than or equal to 5000 $\mu m^2 \cdot nm^2 \cdot km/ps$ or even 2500 $\mu m^2 \cdot nm^2 \cdot km/ps$.

The fiber of the invention preferably has a chromatic dispersion cancellation wavelength $\lambda_0$ less than or equal to 1480 nm.

In one embodiment of the invention the fiber has an effective surface area greater than or equal to 70 $\mu m^2$.

The fiber of the invention has bending losses at 1550 nm less than or equal to 0.05 dB and preferably less than or equal to 0.005 dB for 100 turns of fiber wound with a radius of 30 mm. It can also have a sensitivity to microbends less than 1.2 and preferably less than 0.8.

The fiber preferably has a theoretical cut-off wavelength greater than 1550 nm and an in-cable cut-off wavelength less than 1300 nm.

In one embodiment of the invention the fiber has an attenuation at 1550 nm less than or equal to 0.23 dB/km and a polarization modal dispersion less than or equal to 0.1 $ps \cdot km^{-0.5}$.

In advantageous manner, the difference between the index of the central part of the fiber and the index of the optical cladding can lie in the range $5 \times 10^{-3}$ to $9 \times 10^{-3}$. In this case, the ratio between the radius of the central part and the outside radius of the ring is advantageously in the range 0.23 to 0.45.

Also advantageously, the difference between the index of the intermediate zone and the index of the optical cladding can lie in the range $-4 \times 10^{-3}$ to $1 \times 10^{-3}$ and is preferably in the range $-3 \times 10^{-3}$ to $5 \times 10^{-4}$. In this case, the ratio between the outside radius of the intermediate zone and the outside radius of the ring can lie in the range 0.45 to 0.75 and is preferably in the range 0.48 to 0.7.

In an advantageous embodiment, the difference between the index of the ring and the index of the optical cladding can lie in the range $5 \times 10^{-4}$ to $5 \times 10^{-3}$. In this case, the outside radius of the ring is advantageously in the range 7 $\mu m$ to 13 $\mu m$.

In addition, the parameters of the fiber of the invention can advantageously be chosen in such a manner as to satisfy one or more of the following relationships, in which r is the radius and $\Delta n(r)$ is the index difference between the index at radius r and the index of the optical cladding:

$$S_1 = 2 \cdot \int_0^{r_1} \Delta n(r) \cdot r \cdot dr$$

(where $r_1$ is the radius of the central part), in the range $45 \times 10^{-3}$ $\mu m^2$ to $110 \times 10^{-3}$ $\mu m^2$ and is preferably in the range $50 \times 10^{-3}$ $\mu m^2$ to $110 \times 10^{-3}$ $\mu m^2$.

$$S_{12} = 2 \cdot \int_0^{r_2} \Delta n(r) \cdot r \cdot dr$$

(where $r_2$ is the outside radius of the intermediate zone), greater than $25 \times 10^{-3}$ $\mu m^2$ and is preferably in the range $30 \times 10^{-3}$ $\mu m$ to $100 \times 10^{-3}$ $\mu m^2$.

$$S_{23} = 2 \cdot \int_{r_1}^{r_3} \Delta n(r) \cdot r \cdot dr$$

(where $r_3$ is the outside radius of the annular zone), in the range $30 \times 10^{-3}$ $\mu m^2$ to $150 \times 10^{-3}$ $\mu m^2$ and is preferably in the range $55 \times 10^{-3}$ $\mu m^2$ to $140 \times 10^{-3}$ $\mu m^2$.

$$S_{123} = 2 \cdot \int_0^{r_3} \Delta n(r) \cdot r \cdot dr$$

less than $220 \times 10^{-3}$ $\mu m^2$ and is preferably in the range $130 \times 10^{-3}$ $\mu m$ to $205 \times 10^{-3}$ $\mu m^2$.

The invention also proposes a wavelength division multiplex fiber optic transmission system comprising a fiber as defined hereinabove as line fiber. It can then further comprise dispersion compensating fiber.

BRIEF DESCRIPTION OF THE DRAWINGS

Other features and advantages of the invention will become apparent on reading the following description of embodiments of the invention given by way of example and with reference to the single FIGURE which is a diagram showing the step and ring index profile of a fiber in accordance with the invention.

DETAILED DESCRIPTION OF THE INVENTION

In all the embodiments described, radii r are specified in microns ($\mu m$) and measured relative to the axis of the fiber. Indices $\Delta n$ are expressed as the difference relative to the index of the cladding of the fiber.

Starting from the center of the fiber, the fiber comprises an optical core surrounded by an optical cladding 13. The index profile of the optical core is constituted by:

a step central part 10 of radius $r_1$ with an index difference $\Delta n_1$ relative to the optical cladding 13 which is substantially constant and positive, an intermediate zone 11 which extends out to a radius $r_2$, having an index difference $\Delta n_2$ relative to the optical cladding 13 which is substantially constant, positive or negative, and always less than $\Delta n_1$, and an annular zone or ring 12 which extends out to a radius $r_3$, having an index difference $\Delta n_3$ which is substantially constant, positive, and less than $\Delta n_1$.

The optical cladding 13 of the fiber surrounds the ring 12.

Table 1 below sets out radius and index values for fibers having this type of step and ring profile.

TABLE 1

| N° | $r_1$ | $r_2$ | $r_3$ | $10^{-3} \cdot \Delta n_1$ | $10^{-3} \cdot \Delta n_2$ | $10^{-3} \cdot \Delta n_3$ |
|---|---|---|---|---|---|---|
| 1 | 3.4 | 5.5 | 8.5 | 7.2 | -2.2 | 3.2 |
| 2 | 2.9 | 6.5 | 10 | 7.5 | 0 | 2.2 |
| 3 | 3.3 | 5.1 | 7.8 | 7.1 | -2.1 | 3.2 |
| 4 | 3.7 | 5.6 | 9 | 6.7 | -3.3 | 2.1 |
| 5 | 3.2 | 5.2 | 10.8 | 6.9 | 0 | 1.2 |
| 6 | 3.3 | 6 | 11.6 | 6.8 | 0 | 1.3 |
| 7 | 3 | 5.1 | 8.7 | 7 | 0.35 | 2.5 |
| 8 | 3.6 | 5.7 | 8.8 | 5.9 | 0 | 2.5 |

The features of fibers in accordance with the invention enable them to be fabricated by conventional methods; by way of comparison, the index difference value of 1% routinely mentioned in the prior art corresponds to a difference $\Delta n_1$ equal to $14.5 \times 10^{-3}$. It can be seen that the invention does not imply high index values or layers with very small radii and therefore avoids fabrication problems and also excessive attenuation of the fiber.

At 1.55 $\mu m$ the fibers obtained with the above radius and index values have the specifications set out in the corresponding lines of Table 2, except for the theoretical cut-off and chromatic dispersion cancellation wavelengths. The units are as follows:

theoretical cut-off wavelength $\lambda_{cth}$: nm, chromatic dispersion cancellation wavelength $\lambda_0$: nm, chromatic dispersion C: ps/(nm·km), chromatic dispersion slope C': ps/(nm²·km), effective surface area $S_{eff}$: μm², bending losses PC: dB, microbending losses $S_{\mu c}$: none.

Bending losses are measured as indicated above by winding 100 turns of the fiber with a 30 mm radius and measuring the induced losses. The microbending losses $S_{\mu c}$ are measured relative to the ASMF 200 fiber manufactured by the assignees of the applicants and are dimensionless quantities. The ratio $S_{eff}/C'$ has the dimensions of μm²·nm²·km/ps.

TABLE 2

| N° | $\lambda_{cth}$ | $\lambda_0$ | C | C' | $S_{eff}$ | $S_{eff}/C'$ | PC | $S_{\mu c}$ |
|---|---|---|---|---|---|---|---|---|
| 1 | 1700 | 1475 | 4 | 0.054 | 62 | 1150 | <10⁻⁵ | 0.69 |
| 2 | 1780 | 1475 | 4 | 0.057 | 62 | 1090 | <10⁻⁵ | 0.71 |
| 3 | 1630 | 1460 | 6 | 0.068 | 68 | 1010 | <10⁻⁵ | 0.73 |
| 4 | 1550 | 1380 | 8 | 0.048 | 62 | 1290 | <10⁻⁵ | 0.64 |
| 5 | 1630 | 1410 | 8 | 0.058 | 65 | 1130 | <10⁻⁵ | 0.67 |
| 6 | 1780 | 1400 | 8 | 0.054 | 65 | 1200 | <10⁻⁵ | 0.65 |
| 7 | 1780 | 1440 | 8 | 0.075 | 78 | 1040 | <10⁻⁵ | 0.82 |
| 8 | 1780 | 1370 | 12 | 0.067 | 88 | 1310 | <10⁻⁵ | 0.93 |

In all the examples set out in Table 1, variations of $5 \times 10^{-4}$ in the indices $\Delta n_1$, $\Delta n_2$, and $\Delta n_3$ yield similar results. Likewise the radii, which can individually vary 10% relative to the values given and yield analogous results.

The fiber of the invention can be fabricated by the skilled person using techniques well known in the art, such as MCVD or other techniques routinely used to fabricate optical fibers.

The fiber of the invention can advantageously be used as line fiber in transmission systems, and in particular in wavelength division multiplex transmission systems for the range of wavelengths in the range 1300 nm to 1630 nm. In a system using line fiber of this kind, dispersion compensation fiber can be incorporated into the system at regular intervals to limit the cumulative increase of chromatic dispersion along the transmission line.

Of course, the present invention is not limited to the examples and embodiments described and shown and is open to many variants that will be evident to the skilled person.

What is claimed is:

1. An in-cable monomode optical fiber comprising an optical core surrounded by optical cladding, said optical core presenting an index profile constituted by a stepped central part, surrounded by an intermediate zone of refractive index less than that of said central part, itself surrounded by an annular zone having refractive index less than that of said central part and greater than that of said intermediate zone, said fiber having, for a wavelength of 1550 nm, a chromatic dispersion slope in the range 0 to 0.1 ps/nm²·km, said fiber being characterized in that it further presents the following features for a wavelength of 1550 nm:

an effective surface area greater than or equal to 60 μm², an chromatic dispersion in the range 3 ps/(nm·km) to 14 ps/(nm·km), and a ratio between the effective surface area and the chromatic dispersion slope greater than 900 μm²·nm²·km/ps, characterized in that the size $S_1$ defined $$S_1 = 2\int_0^{r_2} \Delta n(r) \cdot r \cdot dr,$$

where r is the radius and $\Delta n(r)$ the index difference between the index at the radius r and the index of said optical cladding, and where $r_1$ is the radius of said central part, is in the range $45 \times 10^{-3}$ μm² to $110 \times 10^{-3}$ μm² and is preferably in the range $50 \times 10^{-3}$ μm² to $110 \times 10^{-3}$ μm².

2. The fiber of claim 1, characterized in that it has a chromatic dispersion at 1550 nm in the range 5 ps/(nm·km) to 11 ps/(nm·km).

3. The fiber of claim 1, characterized in that it has a chromatic dispersion slope at 1550 nm less than 0.07 ps/(nm²·km).

4. The fiber of claim 1, characterized in that it has a ratio between the effective surface area and the chromatic dispersion slope greater than or equal to 1000 μm²·nm²·km/ps, and preferably less than or equal to 5000 μm²·nm²·km/ps.

5. The fiber of claim 1, characterized in that it has a chromatic dispersion cancellation wavelength less than or equal to 1480 nm.

6. The fiber of claim 1, characterized in that it has an effective surface area greater than or equal to 70 μm².

7. The fiber of claim 1, characterized in that it has bending losses at 1550 nm less than or equal to 0.05 dB and preferably less than or equal to 0.005 dB for 100 turns of fiber wound with a radius of 30 mm.

8. The fiber of claim 1, characterized in that it has a sensitivity to microbends less than 1.2 and preferably less than 0.8.

9. The fiber of claim 1, characterized in that it has a theoretical cut-off wavelength greater than 1550 nm.

10. The fiber of claim 1, characterized in that it has an in-cable cut-off wavelength less than 1300 nm.

11. The fiber of claim 1, characterized in that it has an attenuation at 1550 nm less than or equal to 0.23 dB/km.

12. The fiber of claim 1, characterized in that it has a polarization modal dispersion less than or equal to 0.1 ps·km$^{-0.5}$.

13. The fiber of claim 1, characterized in that the index difference $\Delta n_1$ between the index of said central part and the index of said cladding is in the range $5 \times 10^{-3}$ to $9 \times 10^{-3}$.

14. The fiber of claim 13, characterized in that the ratio $r_1/r_3$ between the radius $r_1$ of said central part and the outside radius $r_3$ of the ring is in the range 0.23 to 0.45.

15. The fiber of claim 1, characterized in that the index difference $\Delta n_2$ between the index of said intermediate zone and the index of said cladding is in the range $-4 \times 10^{-3}$ to $1 \times 10^{-3}$ and is preferably in the range $-3 \times 10^{-3}$ to $5 \times 10^{-4}$.

16. The fiber of claim 15, characterized in that the ratio $r_2/r_3$ between the outside radius $r_2$ of said intermediate zone and the outside radius $r_3$ of said annular zone is in the range 0.45 to 0.75 and is preferably in the range 0.48 to 0.7.

17. The fiber of claim 1, characterized in that the difference $\Delta n_3$ between the index of said annular zone and the index of said cladding is in the range $5 \times 10^{-4}$ to $5 \times 10^{-3}$.

18. The fiber of claim 17, characterized in that the outside radius $r_3$ of said annular zone is in the range 7 μm to 13 μm.

19. A wavelength division multiplex fiber optic transmission system comprising a fiber of claim 1 as line fiber.

20. The transmission system of claim 19 further comprising dispersion compensating fiber.

21. An in-cable monomode optical fiber comprising an optical core surrounded by optical cladding, said optical core presenting an index profile constituted by a stepped central part, surrounded by an intermediate zone of refractive index less than that of said central part, itself surrounded by an annular zone having refractive index less than that of said central part and greater than that of said intermediate zone, said fiber having, for a wavelenght of 1550 nm, a chromatic dispersion slope in the range 0 to 0.1 ps/nm²·km, said fiber being characterized in that it further presents the following features for a wavelenghts of 1550 nm:
   an effective surface area greater than or equal to 60 $\mu m^2$,
   an chromatic dispersion in the range 3 ps/(nm·km) to 14 ps/(nm·km), and
   a ratio between the effective surface area and 20 the chromatic dispersion slope greater than 900 $\mu m^2 \cdot nm^2 \cdot km/ps$,
   characterized in that the size $S_{12}$ is defined by $$S_{12} = 2 \cdot \int_0^{r_2} \Delta n(r) \cdot r \cdot dr,$$

where r is the radius and $\Delta n(r)$ the index difference between the index at the radius r and the index of said optical cladding, and where $r_2$ is the outside radius of said intermediate zone, is greater than $25 \times 10^{-3} \mu m^2$ and is preferably in the range $30 \times 10^{-3}$ to $100 \times 10^{-3} \mu m^2$.

22. The fiber of claim 21, characterized in that it has a chromatic dispersion at 1550 nm in the range 5 ps/(nm·km) to 11 ps/(nm·km).

23. The fiber of claim 21, characterized in that it has a chromatic dispersion slope at 1550 nm less than 0.07 ps/(nm²·km).

24. The fiber of claim 21, characterized in that it has a ratio between the effective surface area and the chromatic dispersion slope greater than or equal to 1000 $\mu m^2 \cdot nm^2 \cdot km/ps$, and preferably less than or equal to 5000 $\mu m^2 \cdot nm^2 \cdot km/ps$.

25. The fiber of claim 21, characterized in that it has a chromatic dispersion cancellation wavelength less than or equal to 1480 nm.

26. The fiber of claim 21, characterized in that it has an effective surface area greater than or equal to 70 $\mu m^2$.

27. The fiber of claim 21, characterized in that it has bending losses at 1550 nm less than or equal to 0.05 dB and preferably less than or equal to 0.005 dB for 100 turns of fiber wound with a radius of 30 mm.

28. The fiber of claim 21, characterized in that it has a sensitivity to microbends less than 1.2 and preferably less than 0.8.

29. The fiber of claim 21, characterized in that it has a theoretical cut-off wavelength greater than 1550 nm.

30. The fiber of claim 21, characterized in that it has an in-cable cut-off wavelength less than 1300 nm.

31. The fiber of claim 21, characterized in that it has an attenuation at 1550 nm less than or equal to 0.23 dB/km.

32. The fiber of claim 21, characterized in that it has a polarization modal dispersion less than or equal to 0.1 $ps \cdot km^{-0.5}$.

33. The fiber of claim 21, characterized in that the index difference $\Delta n_1$ between the index of said central part and the index of said cladding is in the range $5 \times 10^{-3}$ to $9 \times 10^{-3}$.

34. The fiber of claim 33, characterized in that the ratio $r_1/r_3$ between the radius $r_1$ of said central part and the outside radius $r_3$ of the ring is in the range 0.23 to 0.45.

35. The fiber of claim 21, characterized in that the index difference $\Delta n_2$ between the index of said intermediate zone and the index of said cladding is in the range $-4 \times 10^{-3}$ to $1 \times 10^{-3}$ and is preferably in the range $-3 \times 10^{-3}$ to $5 \times 10^{-4}$.

36. The fiber of claim 35, characterized in that the ratio $r_2/r_3$ between the outside radius $r_2$ of said intermediate zone and the outside radius $r_3$ of said annular zone is in the range 0.45 to 0.75 and is preferably in the range 0.48 to 0.7.

37. The fiber of claim 21, characterized in that the index difference $\Delta n_3$ between the index of said annular zone and the index of said cladding is in the range $5 \times 10^{-4}$ to $5 \times 10^{-3}$.

38. The fiber of claim 37, characterized in that the outside radius $r_3$ of said annular zone is in the range 7 $\mu m$ to 13 $\mu m$.

39. A wavelength division multiplex fiber optic transmission system comprising a fiber of claim 21 as line fiber.

40. The transmission system of claim 39 further comprising dispersion compensating fiber.

41. An in-cable monomode optical fiber comprising an optical core surrounded by optical cladding, said optical core presenting an index profile constituted by a stepped central part, surrounded by an intermediate zone of refractive index less than that of said central part, itself surrounded by an annular zone having refractive index less than that of said central part and greater than that of said intermediate zone, said fiber having, for a wavelength of 1550 nm, a chromatic dispersion slope in the range 0 to 0.1 ps/nm²·km, said fiber being characterized in that it further presents the following features for a wavelength of 1550 nm:
   an effective surface area greater than or equal to 60 $\mu m^2$,
   an chromatic dispersion in the range 3 ps/(nm·km) to 14 ps/(nm·km), and
   a ratio between the effective surface area and 20 the chromatic dispersion slope greater than 900 $\mu m^2 \cdot nm^2 \cdot km/ps$,
   characterized in that the size $S_{23}$ defined by $$S_{23} = 2 \cdot \int_0^{r_2} \Delta n(r) \cdot r \cdot dr,$$

where r is the radius and $\Delta n(r)$ the index difference between the index at the radius r and the index of said optical cladding, and where $r_3$ is the outside radius of said annular zone, is in the range $30 \times 10^{-3} \mu m^2$ to $150 \times 10^{-3} \mu m^2$ and is preferably in the range $55 \times 1010^{-3} \mu m^2$ to $140 \times 10^{-3} \mu m^2$.

42. The fiber of claim 41, characterized in that it has a chromatic dispersion at 1550 nm in the range 5 ps/(nm·km) to 11 ps/(nm·km).

43. The fiber of claim 41, characterized in that it has a chromatic dispersion slope at 1550 nm less than 0.07 ps/(nm²·km).

44. The fiber of claim 41, characterized in that it has a ratio between the effective surface area and the chromatic dispersion slope greater than or equal to 1000 $\mu m^2 \cdot nm^2 \cdot km/ps$, and preferably less than or equal to 5000 $\mu m^2 \cdot nm^2 \cdot km/ps$.

45. The fiber of claim 41, characterized in that it has a chromatic dispersion cancellation wavelength less than or equal to 1480 nm.

46. The fiber of claim 41, characterized in that it has an effective surface area greater than or equal to 70 $\mu m^2$.

47. The fiber of claim 41, characterized in that it has bending losses at 1550 nm less than or equal to 0.05 dB and preferably less than or equal to 0.005 dB for 100 turns of fiber wound with a radius of 30 mm.

48. The fiber of claim 41, characterized in that it has a sensitivity to microbends less than 1.2 and preferably less than 0.8.

49. The fiber of claim 41, characterized in that it has a theoretical cut-off wavelength greater than 1550 nm.

50. The fiber of claim 41, characterized in that it has an in-cable cut-off wavelength less than 1300 nm.

51. The fiber of claim 41, characterized in that it has an attenuation at 1550 nm less than or equal to 0.23 dB/km.

52. The fiber of claim 41, characterized in that it has a polarization modal dispersion less than or equal to 0.1 ps·km$^{-0.5}$.

53. The fiber of claim 41, characterized in that the index difference $\Delta n_1$ between the index of said central part and the index of said cladding is in the range $5\times10^{-3}$ to $9\times10^{-3}$.

54. The fiber of claim 53, characterized in that the ratio $r_1/r_3$ between the radius $r_1$ of said central part and the outside radius $r_3$ of the ring is in the range 0.23 to 0.45.

55. The fiber of claim 41, characterized in that the index difference $\Delta n_2$ between the index of said intermediate zone and the index of said cladding is in the range $-4\times10^{-3-}$ to $1\times10^{-3}$ and is preferably in the range $-3\times10^{-3}$ to $5\times10^{-4}$.

56. The fiber of claim 55, characterized in that the ratio $r_2/r_3$ between the outside radius $r_2$ of said intermediate zone and the outside radius $r_3$ of said annular zone is in the range 0.45 to 0.75 and is preferably in the range 0.48 to 0.7.

57. The fiber of claim 41, characterized in that the index difference $\Delta n_3$ between the index of said annular zone and the index of said cladding is in the range $5\times10^{-4}$ to $5\times10^{-3}$.

58. The fiber of claim 57, characterized in that the outside radius $r_3$ of said annular zone is in the range 7 $\mu$m to 13 $\mu$m.

59. A wavelength division multiplex fiber optic transmission system comprising a fiber of claim 41 as line fiber.

60. The transmission system of claim 59 further comprising dispersion compensating fiber.

61. An in-cable monomode optical fiber comprising an optical core surrounded by optical cladding, said optical core presenting an index profile constituted by a stepped central part, surrounded by an intermediate zone of refractive index less than that of said central part, itself surrounded by an annular zone having refractive index less than that of said central part and greater than that of said intermediate zone, said fiber having, for a wavelength of 1550 nm, a chromatic dispersion slope in the range 0 to 0.1 ps/nm$^2$·km, said fiber being characterized in that it further presents the following features for a wavelength of 1550 nm:

an effective surface area greater than or equal to 60 $\mu$m$^2$, an chromatic dispersion in the range 3 ps/(nm·km) to 14 ps/(nm·km), and a ratio between the effective surface area and 20 the chromatic dispersion slope greater than 900 $\mu$m$^2$·nm$^2$·km/ps, characterized in that the size $S_{123}$ defined by $$S_{123} = 2 \cdot \int_0^{r_2} \Delta n(r) \cdot r \cdot dr,$$

where r is the radius and $\Delta n(r)$ the index difference between the index at the radius r and the index of said optical cladding, and where $r_3$ is the outside radius of said annular zone, is less than $220\times10^{-3}$ $\mu$m$^2$ and is preferably in the range $130\times10^{-3}$ $\mu$m$^2$ to $205\times10^{-3}$ $\mu$m$^2$.

62. The fiber of claim 61, characterized in that it has a chromatic dispersion at 1550 nm in the range 5 ps/(nm·km) to 11 ps/(nm·km).

63. The fiber of claim 61, characterized in that it has a chromatic dispersion slope at 1550 nm less than 0.07 ps/(nm$^2$·km).

64. The fiber of claim 61, characterized in that it has a ratio between the effective surface area and the chromatic dispersion slope greater than or equal to 1000 $\mu$m$^2$·nm$^2$·km/ps, and preferably less than or equal to 5000 $\mu$m$^2$·nm$^2$·km/ps.

65. The fiber of claim 61, characterized in that it has a chromatic dispersion cancellation wavelength less than or equal to 1480 nm.

66. The fiber of claim 61, characterized in that it has an effective surface area greater than or equal to 70 $\mu$m$^2$.

67. The fiber of claim 61, characterized in that it has bending losses at 1550 nm less than or equal to 0.05 dB and preferably less than or equal to 0.005 dB for 100 turns of fiber wound with a radius of 30 mm.

68. The fiber of claim 61, characterized in that it has a sensitivity to microbends less than 1.2 and preferably less than 0.8.

69. The fiber of claim 61, characterized in that it has a theoretical cut-off wavelength greater than 1550 nm.

70. The fiber of claim 61, characterized in that it has an in-cable cut-off wavelength less than 1300 nm.

71. The fiber of claim 61, characterized in that it has an attenuation at 1550 nm less than or equal to 0.23 dB/km.

72. The fiber of claim 61, characterized in that it has a polarization modal dispersion less than or equal to 0.1 ps·km$^{-0.5}$.

73. The fiber of claim 61, characterized in that the index difference $\Delta n_1$ between the index of said central part and the index of said cladding is in the range $5\times10^{-3}$ to $9\times10^{-3}$.

74. The fiber of claim 73, characterized in that the ratio $r_1/r_3$ between the radius $r_1$ of said central part and the outside radius $r_3$ of the ring is in the range 0.23 to 0.45.

75. The fiber of claim 61, characterized in that the index difference $\Delta n_2$ between the index of said intermediate zone and the index of said cladding is in the range $-4\times10^{-3-}$ to $1\times10^{-3}$ and is preferably in the range $-3\times10^{-3}$ to $5\times10^{-4}$.

76. The fiber of claim 75, characterized in that the ratio $r_2/r_3$ between the outside radius $r_2$ of said intermediate zone and the outside radius $r_3$ of said annular zone is in the range 0.45 to 0.75 and is preferably in the range 0.48 to 0.7.

77. The fiber of claim 61, characterized in that the index difference $\Delta n_3$ between the index of said annular zone and the index of said cladding is in the range $5\times10^{-4}$ to $5\times10^{-3}$.

78. The fiber of claim 77, characterized in that the outside radius $r_3$ of said annular zone is in the range 7 $\mu$m to 13 $\mu$m.

79. A wavelength division multiplex fiber optic transmission system comprising a fiber of claim 61 as line fiber.

80. The transmission system of claim 79 further comprising dispersion compensating fiber.

* * * * *